United States Patent
Lai (10) Patent No.: US 8,107,215 B2
(45) Date of Patent: Jan. 31, 2012

(54) CAPACITOR

(75) Inventor: Chee Hong Lai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 12/393,181

(22) Filed: Feb. 26, 2009

(65) Prior Publication Data

US 2009/0219669 A1    Sep. 3, 2009

(30) Foreign Application Priority Data

Feb. 29, 2008 (JP) ................................ 2008-049797

(51) Int. Cl.
*H01G 4/228* (2006.01)
*H01G 4/236* (2006.01)
*H01G 4/005* (2006.01)

(52) U.S. Cl. .................. 361/306.3; 361/307; 361/306.1; 361/303

(58) Field of Classification Search .................. 361/303, 361/306.3, 307, 311
See application file for complete search history.

(56) References Cited

U.S. PATENT DOCUMENTS

| 6,646,860 | B2 * | 11/2003 | Takaramoto et al. ...... 361/306.3 |
| 2002/0047154 | A1 | 4/2002 | Sowlati et al. |
| 2004/0135189 | A1 | 7/2004 | Kiyotoshi |
| 2005/0219790 | A1 | 10/2005 | Abdallah et al. |
| 2005/0242438 | A1 | 11/2005 | Cathelin et al. |
| 2006/0086965 | A1 * | 4/2006 | Sakaguchi et al. ............ 257/307 |
| 2006/0181656 | A1 | 8/2006 | Nabeshima |

FOREIGN PATENT DOCUMENTS

| JP | 11-317500 | 11/1999 |
| JP | 2002-190574 | 7/2002 |
| JP | 2002-299555 | 10/2002 |
| JP | 2003-124329 | 4/2003 |
| JP | 2003-530699 | 10/2003 |
| JP | 2004-165559 | 6/2004 |
| JP | 2005-524993 | 8/2005 |
| JP | 2006-511929 | 4/2006 |
| JP | 2006-228803 | 8/2006 |

* cited by examiner

*Primary Examiner* — Jayprakash N Gandhi
*Assistant Examiner* — Arun Ramaswamy
(74) *Attorney, Agent, or Firm* — Katten Muchin Rosenman LLP

(57) ABSTRACT

A capacitor includes a first terminal having a first polarity, a second terminal having a second polarity opposed to the first polarity, and a plurality of columnar portions for connecting the first terminal to the second terminal. Each of the plurality of columnar portions includes a first conductor bar electrically connected to the first terminal, a second conductor bar electrically connected to the second terminal, and a dielectric layer between the first and second conductor bars.

5 Claims, 8 Drawing Sheets

CAPACITOR

CROSS-REFERENCE TO RELATED APPLICATIONS

This application is based upon and claims the benefit of priority of the prior Japanese Patent Application No. 2008-49797, filed on Feb. 29, 2008, the entire contents of which are incorporated herein by reference.

FIELD

Certain aspects of the present invention discussed herein are related to a capacitor.

BACKGROUND

A capacitor for temporarily accumulating electric charges in a metalized layer on a semiconductor substrate is formed from three or more vapor-deposited layers using a semiconductor process technique. Since such a capacitor forms a frequency resonator and an impedance convertor, the capacitor is used in a semiconductor chip together with reactance elements and resistors. The capacitor can also be used alone to block direct current.

The capacitance of a capacitor is a function of the area of the part where two electrodes come close to each other, and is determined by the area of a surface portion where the capacitor is provided on the chip. It is desirable to elevate the capacitance per unit area in order to minimize the area occupied by the capacitor.

The examples of existing capacitors integrated on a semiconductor chip include an MIM (metal-insulator-metal) capacitor and an inter-digitated capacitor.

The MIM capacitor has a simple structure, which is a direct realizing method for forming capacitance in a semiconductor chip. The capacitor is composed of two metal layers in the direction parallel to the surface of the substrate (lateral direction), and a dielectric material sandwiched between the metal layers. The capacitance thereof is determined by the area of the portion common to the laminated three layers. Although this laminated structure efficiently forms the electric field in the vertical direction (the direction perpendicular to the surface of the substrate) between the metal layers, the capacitance is limited by the area that can be occupied on the semiconductor chip and the permittivity of the inductor of the dielectric material.

On the other hand, as a method to increase capacitance per unit area, a lateral-direction inter-digitated capacitor, wherein a lateral-direction electric field is formed by arranging thin and long metal bars having opposed polarities so as to adjoin to each other using the same metal layer, is proposed (for example, refer to Japanese National Publication of International Patent Application No. 2003-530699).

In vertical-direction inter-digitated capacitors, thin and long metal bars are formed in the vertical direction using a plurality of metal vapor-deposited layers (for example, refer to Japanese Laid-Open Patent Publication No. 2002-299555 and Japanese National Publication of International Patent Application No. 2006-511929). Respective metal bars have the same height, and are arranged so as to adjoin different metal bars having opposite polarities. Thereby a large effective area can be secured between electrodes having opposite polarities, and a large capacitance can be realized for each unit area occupied on a semiconductor chip.

In conventional readjustment, the fact that the chip area occupied by a capacitor is directly affected by the capacitance of the chip has been used. Therefore, if the capacitance of a capacitor is changed, the area occupied by the capacitor on a chip is also changed. However, if this dependence can be relieved, a capacitor block having a predetermined size can be used. It is preferable to elevate capacitance per unit area while allowing change in the design of the capacitor structure.

SUMMARY

Furthermore, the structure of the capacitor preferably allows the readjustment of a design. The readjustment of a design is required in the process of designing an integrated circuit chip, and includes work for changing the capacitance of a capacitor used in the circuit after completing the initial chip mask layout design. At this time, for maintaining the exterior chip mask design, readjustment that does not change the size of the capacitor block is required.

According to a certain aspect of the invention, a capacitor includes a first terminal having a first polarity, a second terminal having a second polarity opposed to the first polarity, and a plurality of columnar portions for connecting the first terminal to the second terminal, wherein each of the plurality of columnar portions includes a first conductor bar electrically connected to the first terminal, a second conductor bar electrically connected to the second terminal, and a dielectric layer between the first and second conductor bars.

According to a certain aspect of the invention, a capacitor includes a pair of first and second electrodes, first and second conductive members connected to the first electrode and having different lengths, and third and fourth conductive members connected to the second electrode and having different lengths, wherein the first conductive member faces the third conductive member, and the second conductive member faces the fourth conductive member to form capacitive coupling, respectively; and a side surface of the first conductive member longer than a second conductive member facing the side surface of a fourth conductive member longer than the third conductive member to form further capacitive coupling.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments for carrying out present invention are described with reference to the figures.

In the first aspect of an embodiment, a capacitor includes a first terminal having a first polarity, a second terminal having a second polarity opposed to the first polarity, and a plurality of columnar portions for connecting the first terminal to the second terminal. Each of these columnar portions includes a first conductor bar electrically connected to the first terminal, a second conductor bar electrically connected to the second terminal, and a dielectric layer between the first and second conductor bars.

According to such a capacitor structure, a capacitance is formed between the first and second conductor bars included in each columnar portion. Therefore, by changing the distance between the first and second conductor bars by designing, the capacitance may be changed.

In the second aspect of the embodiment, the first conductor bar included in one of two adjoining columnar portions may partially overlap, in the longitudinal direction of the columnar portions, the second conductor bar included in the other, and a capacitance is formed between the first and second conductor bars. Therefore, by changing at least one of the length of the first conductor bar and the length of the second conductor bar by designing, the capacitance may be changed.

In the third aspect of the embodiment, a capacitor includes a pair of first and second electrodes, first and second conductive members connected to the first electrode and having different lengths, and third and fourth conductive members connected to the second electrode and having different lengths, wherein the first conductive member faces the third conductive member, and the second conductive member faces the fourth conductive member to form capacitive coupling, respectively; and a side surface of the first conductive member longer than the second conductive member facing a side surface of the fourth conductive member longer than the third conductive member to form further capacitive coupling.

Capacitive coupling may be formed not only by the first conductive member facing the third conductive member, and the second conductive member facing the fourth conductive member, but also by the side surface of the first conductive member facing the side surface of the fourth conductive member longer than the third conductive member to form further capacitive coupling. And, thus, the number of coupling sites can be increased, and the degree of freedom in the quantity of coupling may also be raised.

Embodiments are described by referring to figures.

The capacitor according to the present embodiment can be realized by forming at least two conductor bars in the vertical direction for each of the two electrical polarities. At this time, these conductor bars are disposed so that the conductor bars having opposite polarities adjoin to each other. In the readjustment of designing, by changing the length of respective conductor bars or a group of conductor bars, the capacitance value is determined. All the conductor bars do not have to be of the same length, and the length of the respective conductor bars may be determined by an algorithm to maximize the changeable range depending on the electrical requirements of the circuit wherein the capacitor is used. Such conductor bars can be realized, for example, by using at least three layers of vapor-deposited materials by a semiconductor process technique.

Figure 1:
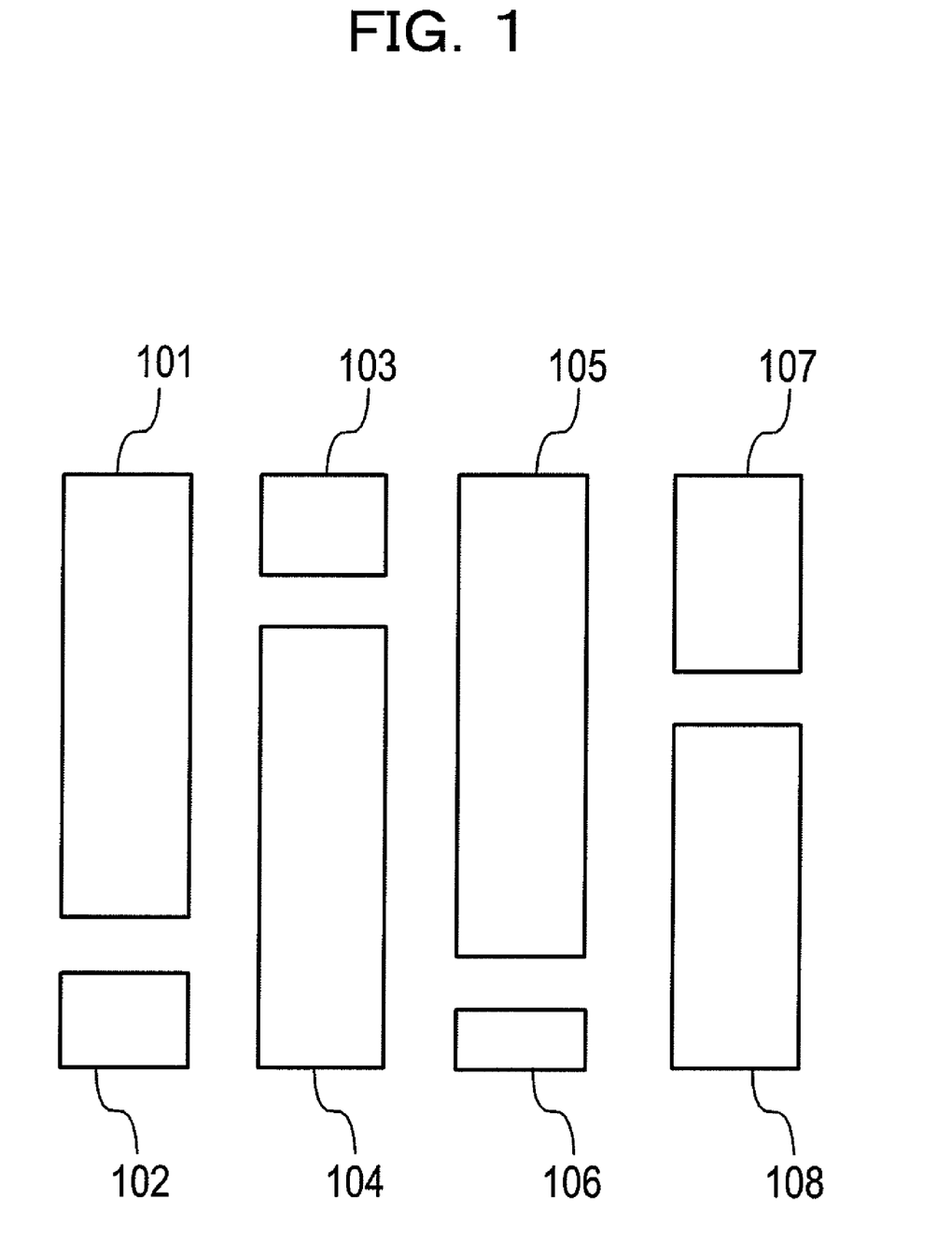
FIG. 1 is an example of a first inter-digitated capacitor.

FIG. 1 is an example of inter-digitated capacitors according to the first embodiment. The inter-digitated capacitor includes conductor bars 101, 103, 105 and 107 having a first polarity; and conductive bars 102, 104, 106 and 108 having a polarity opposite to the first polarity. Spaces between adjoining conductor bars may be filled with a dielectric material. In the design flow, the length of each conductor bar is changeable.

In the inter-digitated capacitor, a capacitance is formed between the conductor bar having the first polarity and the conductor bar adjoining thereto and having the second polarity. For example, concerning the conductor bar 101, a capacitance is formed between the conductor bar 101 and the conductor bar 102; and also between the conductor bar 101 and the conductor bar 104. Concerning the conductor bar 104, a capacitance is formed between the conductor bar 104 and the conductor bar 101, between the conductor bar 104 and the conductor bar 103, and between the conductor bar 104 and the conductor bar 105. The total capacitance of the inter-digitated capacitors is given by the sum of all the capacitance by these conductor bars.

Although eight conductor bars are depicted in FIG. 1, the inter-digitated capacitor can be formed by smaller or larger numbers than eight conductor bars.

Figure 2:
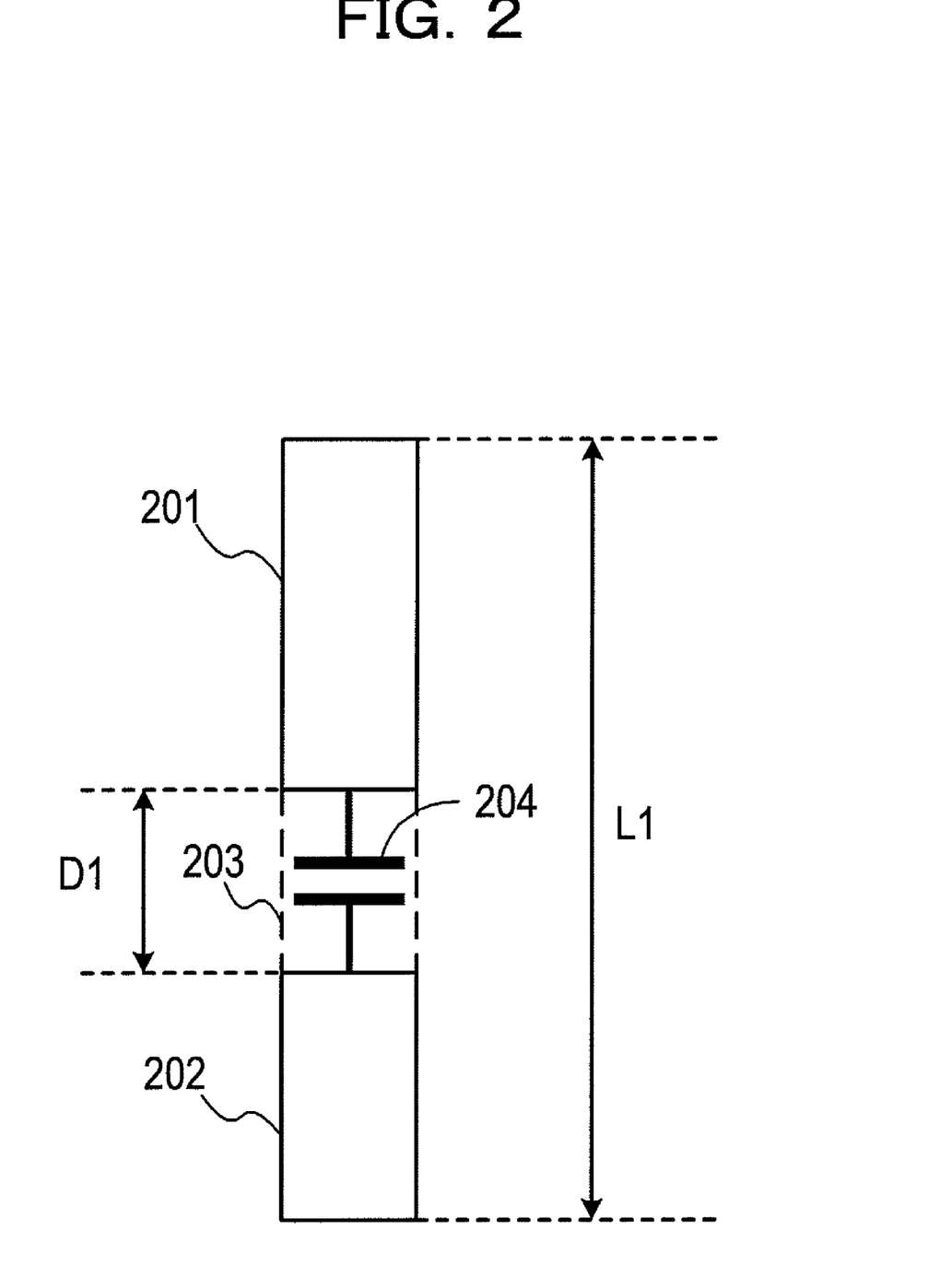
FIG. 2 is an example of a columnar portion.

FIG. 2 depicts an example of the columnar portions of an inter-digitated capacitor. The columnar portion has the conductor bar 201 having the first polarity and the conductor bar 202 having the second polarity, and the two conductor bars sandwich a dielectric material 203 to form a vertical-direction capacitor 204.

The capacitor 204 forms the capacitance for accumulating electric charge mainly using an electric field in the vertical direction by the potential difference between the conductor bar 201 and the conductor bar 202. In the design flow, by changing the distance D1 of the gap between the conductor bar 201 and the conductor bar 202, a desired capacitance change can be obtained. The capacitance lowers when the distance D1 is widened, and the capacitance elevates when the distance D1 is narrowed. The distance D1 of the gap can be adjusted by changing the length of the conductor bar 201 and/or the conductor bar 202, while maintaining the length L1 of the columnar portion constant.

Figure 3:
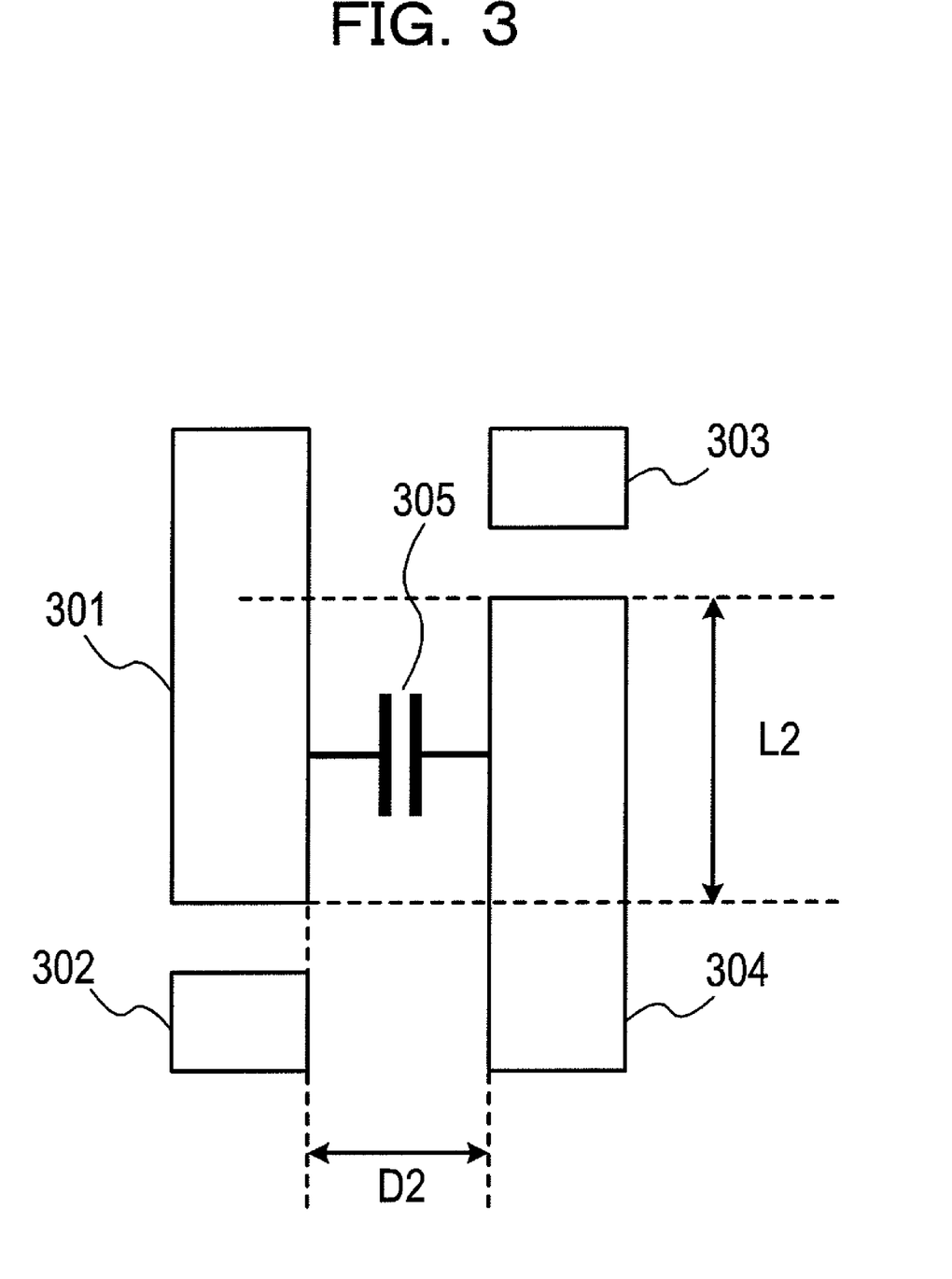
FIG. 3 is an example of a capacitor in the lateral direction between conductor bars.

FIG. 3 depicts two columnar portions in an inter-digitated capacitor. One columnar portion has a conductor bar 301 having a first polarity, and a conductor bar 302 having a second polarity; and the other columnar portion has a conductor bar 303 having the first polarity, and a conductor bar 304 having the second polarity.

Among these, by the electric field in the lateral direction formed by the potential difference between the conductor bar 301 and the conductor bar 304, a capacitance is formed between these conductor bars, and a capacitor 305 in the lateral direction is formed. By changing the length L2 of the overlapped portion in the vertical direction between the conductor bar 301 and the conductor bar 304, a desired change in capacitance can be obtained. When the length L2 is lengthened, the capacitance is elevated; and when the length L2 is shortened, the capacitance is lowered. The length L2 of the overlapped portion can be adjusted by changing the length of the conductor bar 301 and/or the conductor bar 304, while maintaining the length of the two columnar portions constant.

To obtain a desired change in capacitance, the distance D2 between the conductor bar 301 and the conductor bar 304 may also be changed. When the distance D2 is widened, the capacitance is lowered, and when the distance D2 is narrowed, the capacitance is elevated.

Figure 4:
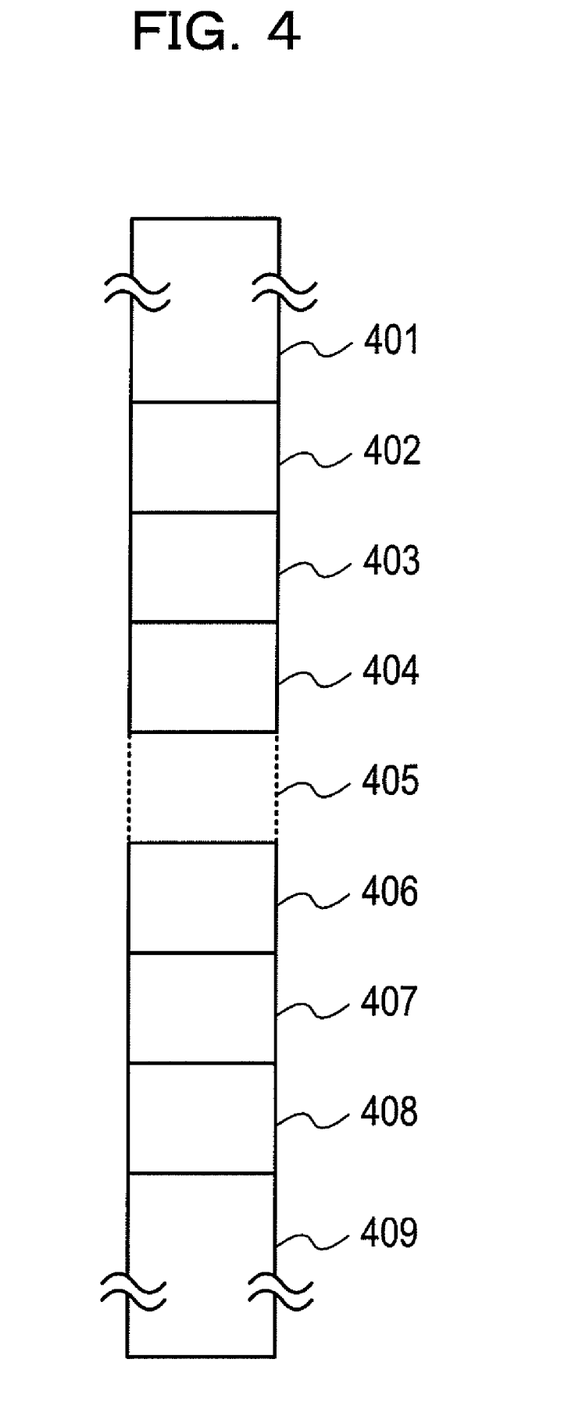
FIG. 4 is an example of a columnar portion formed by using metal layers.

FIG. 4 depicts an example of the columnar portion of an inter-digitated capacitor formed of a vapor-deposited material using a semiconductor process technique. The columnar portion has metal portions 401 and 409; metal layers 402, 404, 406 and 408; metal vias 403 and 407 connecting between the metal layers; and a dielectric layer 405.

Each of the metal portions 401 and 409 are composed of a plurality of metal layers and a plurality of metal vias; the laminated structure composed of the metal portion 401, the metal layers 402 and 404, and the via 403 constitutes a first conductor bar; and the laminated structure composed of the metal layers 406 and 408, the via 407, and the metal portion 409 constitutes a second conductor bar. The first conductor bar is connected to the first electrode having the first polarity via the metal portion 401, and the second conductor bar is connected to the second electrode having the second polarity via the metal portion 409.

The accurate position of the dielectric layer 405 in the columnar portion depends on the number of metal layers and vias composing the first conductor bar, and the number of metal layers and vias composing the second conductor bar. In the design flow, when the number of metal layers and vias included in the first conductor bar is increased, and the number of metal layers and vias included in the second conductor bar is decreased, the position of the dielectric layer 405 shifts downwardly. For example, if the dielectric layer 405 is changed to a via and via 407 is changed, the dielectric layer 405 is shifted to 407. On the contrary, when the number of metal layers and vias included in the first conductor bar is decreased, and the number of metal layers and vias included in the second conductor bar is increased, the position of the dielectric layer 405 shifts upwardly.

If the number of metal layers and vias included in the first or second conductor bar is decreased (for example, removing metal layer 404), the thickness of the dielectric layer 405 is increased; and if the number of metal layers and vias included in the first or second conductor bar is increased (for example, adding metal layer and/or via layer connected to the first or second conductor bar), the thickness of the dielectric layer 405 is decreased.

Figure 5:
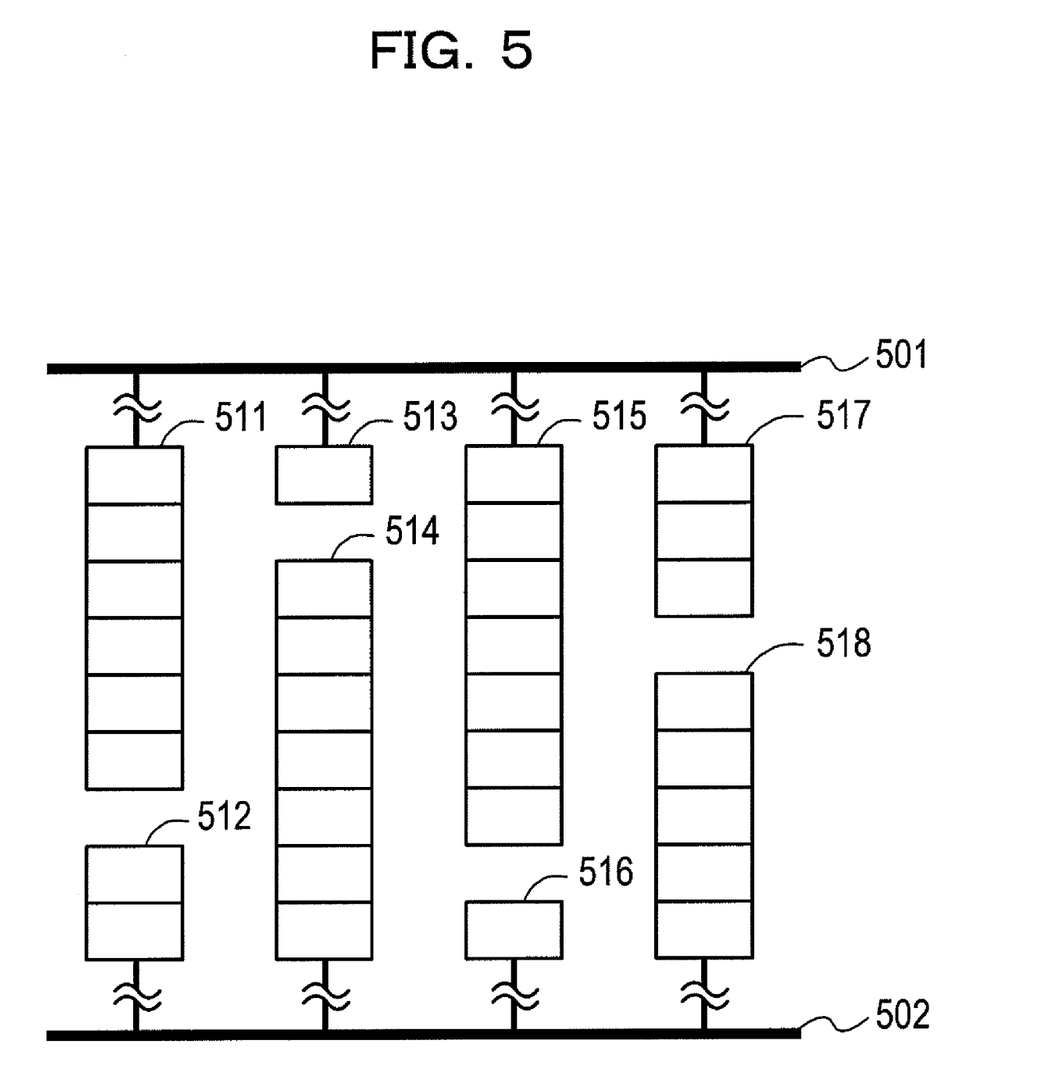
FIG. 5 is an example of an inter-digitated capacitor formed by using metal layers.

FIG. 5 depicts an example of an inter-digitated capacitor formed on a semiconductor chip using the columnar portion illustrated in FIG. 4. The inter-digitated capacitor includes conductor bars 511 to 518. Among these, the conductor bars 511, 513, 515 and 517 are connected to a first electrode terminal 501 having a first polarity; and the conductor bars 512, 514, 516 and 518 are connected to a second electrode terminal 502 having a second polarity. The electrode terminals 501 and 502 are provided, for example, in a direction parallel to the surface of the substrate.

The area of the region where these conductor bars are formed may be a function of the length of the terminals 501 and 502, and the total capacitance of the inter-digitated capacitor is the sum of all the capacitance formed by these conductor bars. As described above, by increasing or decreasing the number of metal layers and vias that constitute respective conductor bars, the location and the thickness of the dielectric layer can be changed. Thereby, the total capacitance can be adjusted by changing the length of the overlapped portion between adjoining conductor bars, or by changing the distance of the gap between the upper and lower conductor bars.

Although eight conductor bars are illustrated in FIG. 5, the inter-digitated capacitor may be formed by smaller or larger numbers than eight conductor bars.

Figure 6:
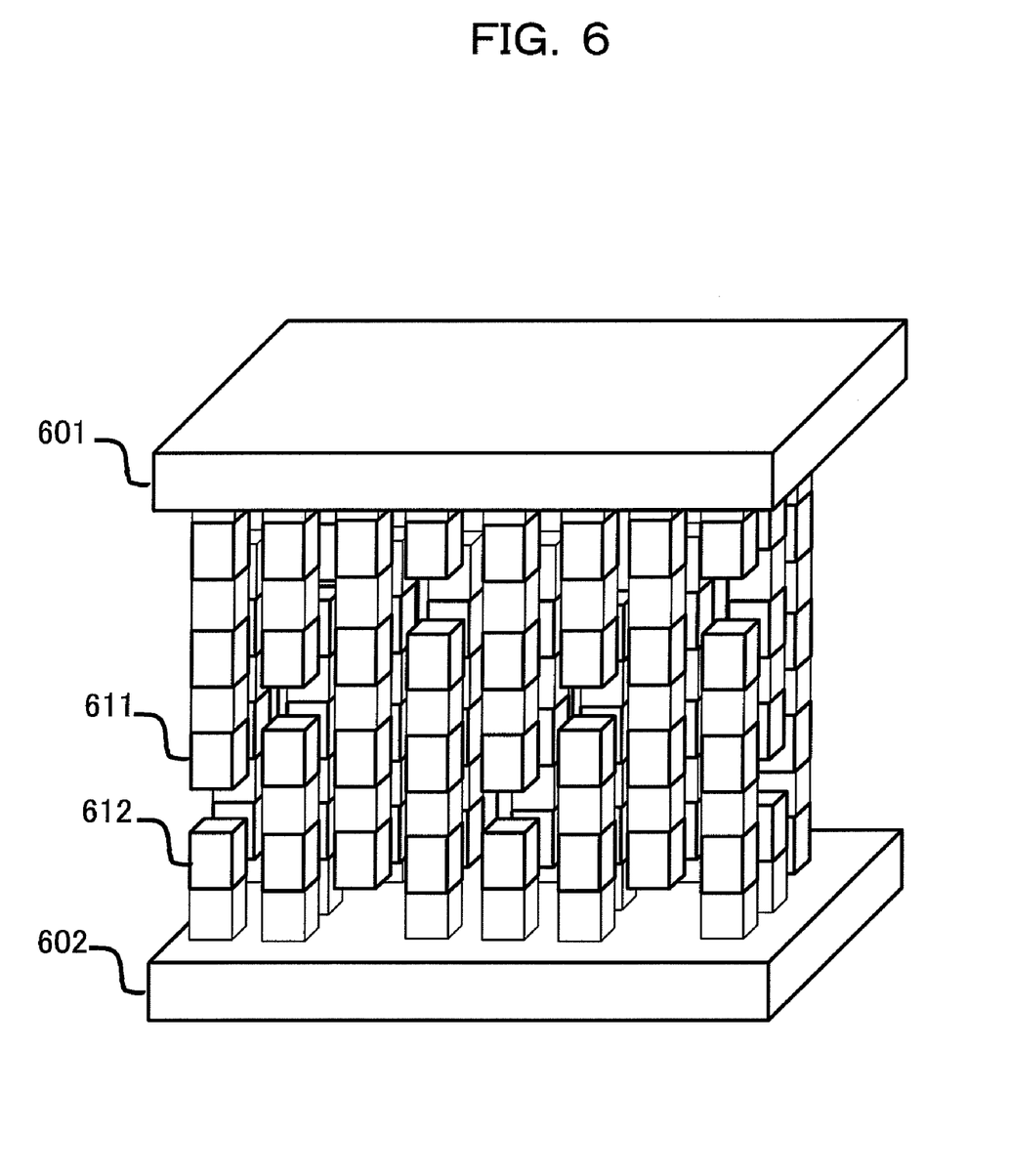
FIG. 6 is an example of a second inter-digitated capacitor.

FIG. 6 depicts an example of a three-dimensional inter-digitated capacitor formed by arranging a plurality of planar inter-digitated capacitors illustrated in FIG. 5 in the depth direction. This inter-digitated capacitor includes a first electrode terminal 601 and a second electrode terminal 602 provided on planes parallel to the surface of a substrate, and a plurality of columnar portions formed between these terminals.

Figure 7:
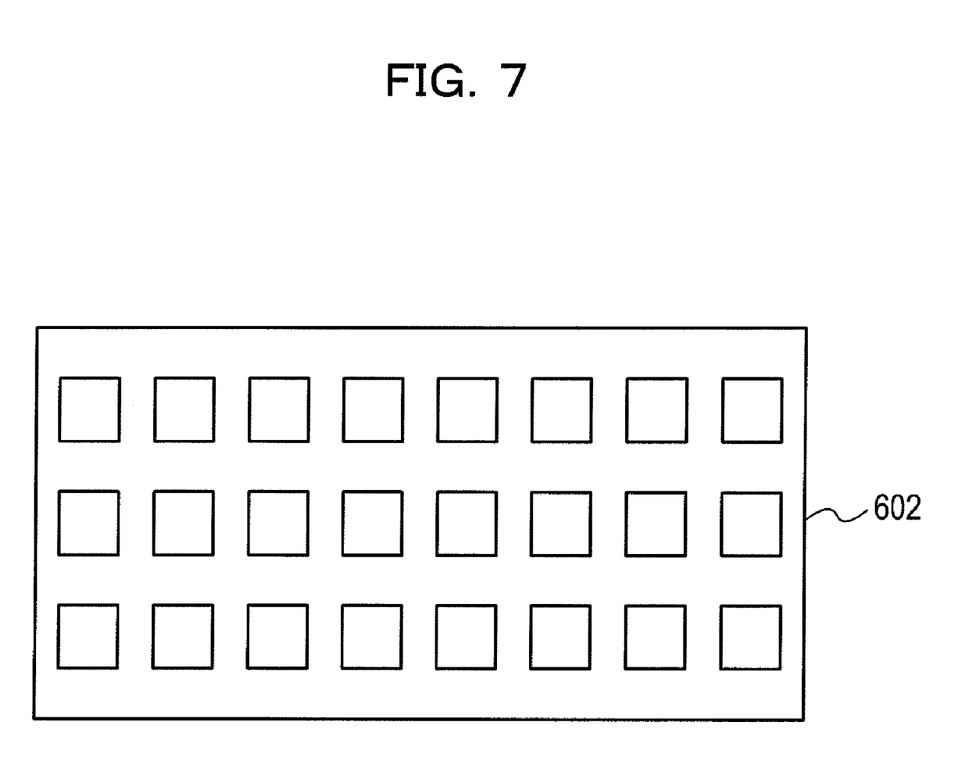
FIG. 7 is an example of a sectional view of a second inter-digitated capacitor.
Figure 8:
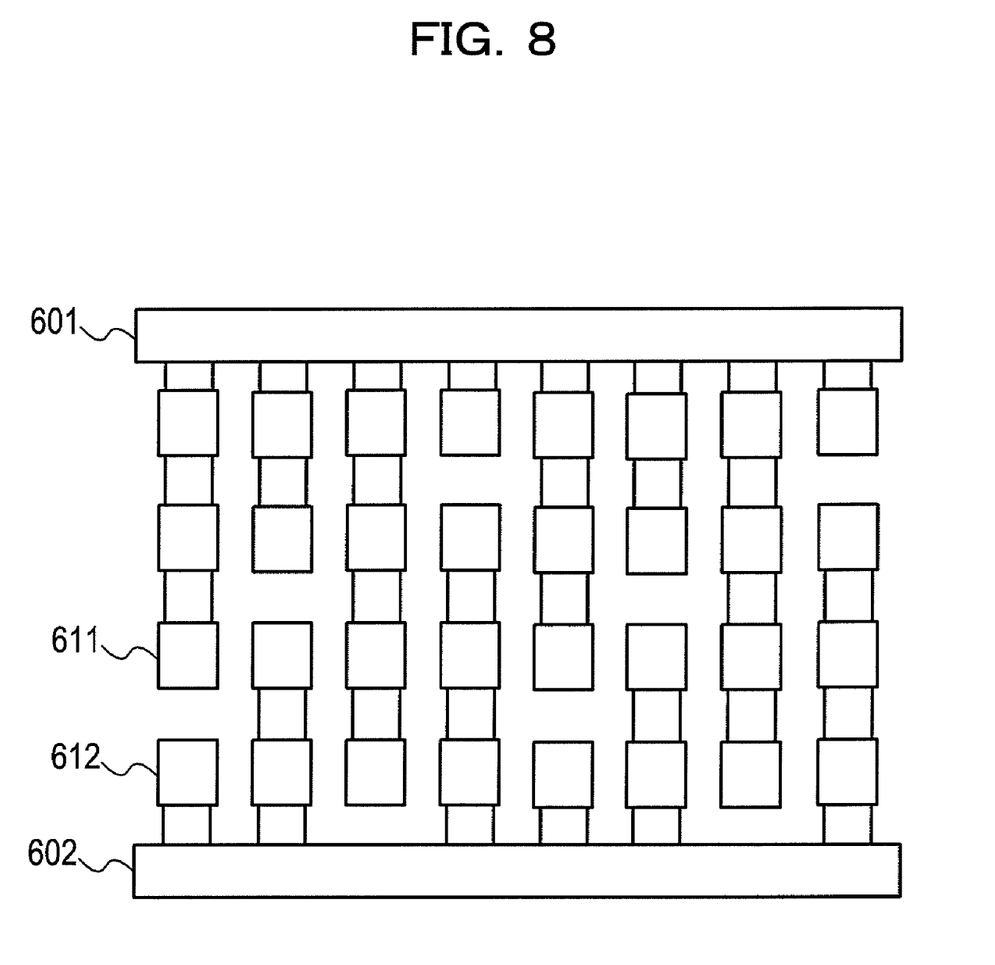
FIG. 8 is an example of a front view of a second inter-digitated capacitor.

FIG. 7 is a sectional view obtained by cutting the inter-digitated capacitor along an appropriate plane between the terminals 601 and 602; and FIG. 8 is a front view of the inter-digitated capacitor. Each columnar portion includes at least one of a first conductor bar 611 connected to the terminal 601 and a second conductor bar 612 connected to the terminal 602. A large number of columnar portions that include corresponding conductor bar(s) may be included.

In this case also, in the same manner as in the inter-digitated capacitor illustrated in FIG. 5, the total capacitance may be adjusted by increasing or decreasing the numbers of metal layers and vias constituting respective conductor bars. Furthermore, the total capacitance can also be adjusted by increasing or decreasing the numbers of columnar portions formed between two terminals to change the distance between adjoining columnar portions.

As described above, a designer of a mask layout can change the capacitance value of a capacitor without readjusting the layout of other elements. Furthermore, the designer may proceed with the design using a predetermined size of a capacitor block, and in the subsequent stage of the design flow, the designer can adjust the capacitance to a specified value.

According to the above-described embodiments, the degree of freedom for adjusting the capacitance is increased.

According to the above-described embodiments, the capacitance per a unit area is increased and capacitance adjustment in a predetermined area in designing a capacitor on a semiconductor substrate is enabled.

According to the above-described embodiments, fine change in capacitance values can be flexibly performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that various changes, substitutions, and alterations could be made hereto without departing from the spirit and scope of the invention.

What is claimed is:
1. A capacitor comprising:
a first electrode;
a second electrode;
first and second conductive members connected to the first electrode, the first conductive member being longer than the second conductive member, the first and second conductive members being provided between the first electrode and the second electrode; and
third and fourth conductive members connected to the second electrode, the fourth conductive member being longer than the third conductive member, the third and fourth conductive members being provided between the first electrode and the second electrode, wherein
the first conductive member faces the third conductive member, and the second conductive member faces the fourth conductive member to form capacitive coupling, respectively, and
a side surface of the first conductive member faces a side surface of the fourth conductive member to form further capacitive coupling.
2. The capacitor according to claim 1, wherein
the first terminal has a first polarity,
the second terminal has a second polarity opposed to the first polarity, and a dielectric layer is provided between the first conductive member and the third conductive member and between the second conductive member and the fourth conductive member.

3. The capacitor according to claim 1, wherein each of the first conductive member, the second conductive member, the third conductive member, and the fourth conductive member has a laminated structure including a plurality of metal layers and electrically conductive vias that connect between said plurality of metal layers.

4. The capacitor according to claim 1, wherein the first conductive member partially overlaps, in a longitudinal direction, the second conductive member.

5. The capacitor according to claim 1, wherein the first conductive member partially overlaps, in a longitudinal direction, the second conductive member, and the third conductive member partially overlaps, in a longitudinal direction, the fourth conductive member.

* * * * *